United States Patent [19]
Raidl, Jr.

[11] 3,872,875
[45] Mar. 25, 1975

[54] RELIEF VALVE ISOLATING MEANS

[76] Inventor: John H. Raidl, Jr., 6625 Milhaven Dr., Mission, Kans. 66202

[22] Filed: Nov. 23, 1970

[21] Appl. No.: 91,620

[52] U.S. Cl.......................... 137/71, 73/4, 137/469, 137/613, 220/89 A
[51] Int. Cl............................................ F16k 17/40
[58] Field of Search................................ 220/89 A; 137/68–71, 797; 73/4

[56] References Cited
UNITED STATES PATENTS

| | | | |
|---|---|---|---|
| 2,225,220 | 12/1940 | Huff | 220/89 A |
| 2,320,211 | 5/1943 | Bloom et al. | 220/89 A |
| 2,336,490 | 12/1943 | Vico | 220/89 A |
| 2,517,858 | 8/1950 | Farris | 137/469 |
| 2,856,096 | 10/1958 | Philip | 220/89 A |
| 3,294,277 | 12/1966 | Wood | 220/89 A |
| 3,485,082 | 12/1969 | Myers | 137/69 X |
| 3,685,686 | 8/1972 | Raidl | 220/89 A |

Primary Examiner—Martin P. Schwadron
Assistant Examiner—Richard Gerard
Attorney, Agent, or Firm—Koenig, Senniger, Powers and Leavitt

[57] ABSTRACT

The combination of a safety relief valve and a frangible diaphragm relief device is disclosed wherein the frangible relief device is positioned upstream of the valve, thereby isolating the relief valve from the system. The isolation of the relief valve from the system pressure secures many process advantages, including reduced valve seat wear and maintenance, elimination of leakage of process fluids and the attendant air pollution, and capability of pressure testing the relief valve means without interruption of the process. The frangible diaphragm is secured to a support ring and the assembly is supported between flanges in the system without any substantial change in the position of the relief valve and its outlet port from the position it occupies when the assembly is not present. This permits installation of the relief device in existing relief valve systems without any changes to the downstream piping. In a preferred embodiment, a reverse acting relief device is employed which is a preassembled unit of a frangible diaphragm, support ring, knife blade and holder which can be mounted in the conventional flange piping connections of the system.

2 Claims, 6 Drawing Figures

RELIEF VALVE ISOLATING MEANS

DESCRIPTION OF THE INVENTION

This invention relates to safety relief systems and, in particular, to systems employing pressure relief valves that vent a pressured system under excessive pressure and that have a valve closure member biased to reseat when the system pressure returns to a safe value.

The equipment used in most continuous chemical processes is vented to reseating pressure relief valves which open and release fluid from the equipment when the pressure therein exceeds a safe operating value and which close when the pressure returns to a safe operating value. These valves are preferred over the rupturable devices since they avoid the necessity to interrupt the process to replace the valve when the system pressure returns to normal. These valves commonly have valve closure members which are spring biased into the closed position.

A number of difficulties are encountered with the relief valves. The valve seats wear and/or corrode during exposure to the process fluids. Process fluids can then leak through the valve, causing air pollution and reducing the efficiency of the process. Since the valve is a mechanical device, it can stick after prolonged exposure to the process fluids which corrode or form deposits on the metal surfaces of the valve. Accordingly, most safety code regulations require periodic testing of the valves. While most testing and maintenance of the valves can often be scheduled with the turn around or normal shut down of the process, excessive leakage through worn valve seats or rigorous code regulations can require shut down of the process to service the safety relief valves.

The advantages of isolating a relief valve from the process with a frangible relief device are, therefore, apparent. Despite these advantages, relief devices have not been adopted for this use because of the difficulties in mounting a device in a relief system without requiring substantial modifications to the relief system piping. The frangible diaphragms, particularly in the reverse acting devices which are preferred for their precision of relief pressure, require special mounting flanges so that the relief valve must be elevated a substantial distance to accommodate the relief device. This requires that similar changes be made to the downstream piping which is connected to the outlet part of the valve. The difficulty and expense of these changes have discouraged any prior attempt to install relief devices in the thousands of existing relief systems which depend on reseating relief valves.

It is therefore an object of this invention to provide an improved safety relief system which utilizes a reseatable relief valve and which reduces or eliminates wear and corrosion of valve seats and closure members of the relief valve.

It is also an object of this invention to provide such a safety relief system which is free of the objectionable leakage commonly experienced with such relief valves.

It is an additional object of this invention to provide such a safety relief system with means permitting servicing and testing of the relief valve without interruption of the process protected by the system.

It is a further object to provide a safety relief system which is compatible with existing safety relief systems and which can be installed with a minimum of changes to such systems.

It is likewise an object of this invention to provide such a safety relief system by simple modifications to replaceable components of existing relief systems, thereby simplifying the installation and servicing of the system.

Other and related objects will be apparent from the following description of the invention.

The preceding objects are achieved by this invention which comprises an assembly of a frangible diaphragm relief device and a support ring therefor supported upstream of a relief valve by means being operative to secure the relief assembly in a sealing position without any substantial change in the position of the relief valve from its position when the relief assembly is not present, whereby the relief assembly can be installed without alteration of the discharge piping communicating with the outlet of the relief valve. Preferably, a reverse acting relief device is used having a prebulged diaphragm with its convex side directed upstream and a knife blade supported downstream of the diaphragm and in axial proximity thereto whereby the diaphragm is impaled on the knife blade when it is caused to snap over center and reverse its position by excessive pressure in the system. The reverse acting relief device can be preassembled into a single unit which will fit within the piping of the system and which has an annular flange that can be sealed between mating piping flanges. The inlet nozzle, conventional in most relief valves, can also be counterbored to provide a recessed seat in which some or all of the peripheral flange of the diaphragm, its support ring, and the knife blade holder can be mounted to avoid the prohibitive increase in elevation of the relief valve.

The invention will now be described with regard to the FIGURES, of which:

Figure 1:
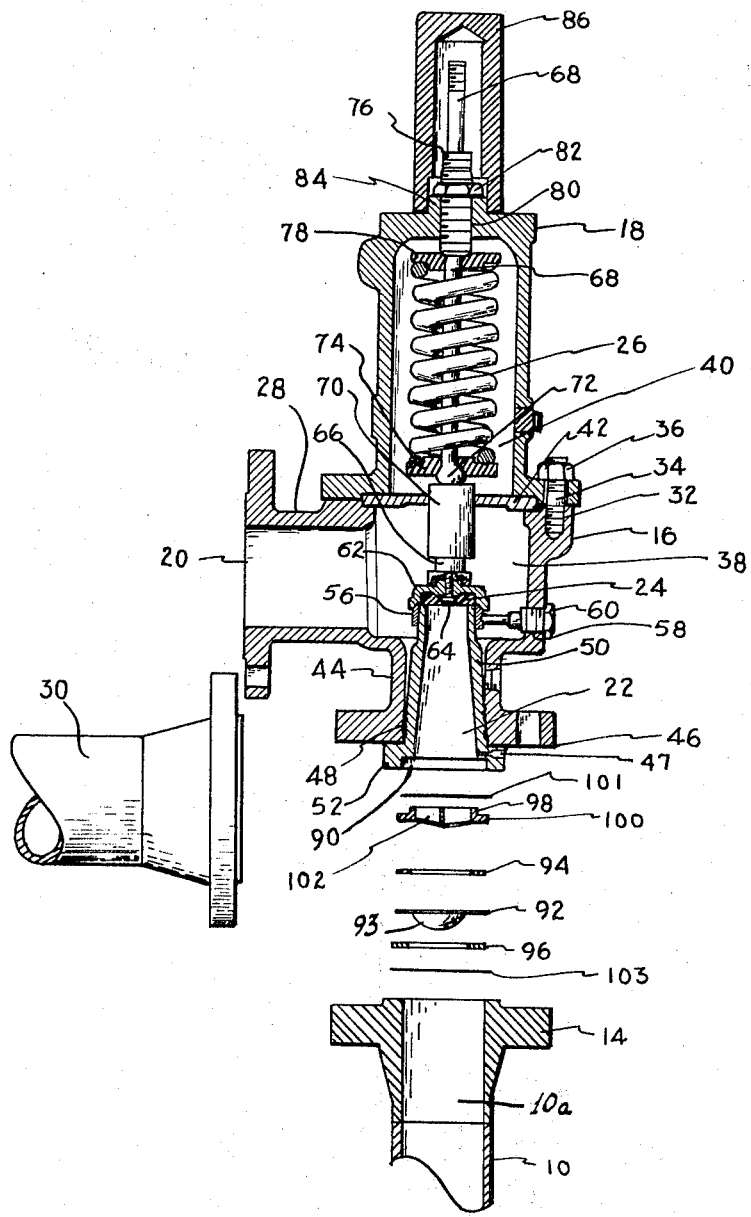
FIG. 1 is an exploded view of the application of this invention to an existing safety relief system.

Referring now to FIG. 1, there is shown an enclosed pressured system having flanged joints connecting its vent means to a relief valve. The system comprises piping 10 providing an exit passage 10a for communication with the relief valve, with flange 14 at the end of this passage. The piping connects to enclosed process equipment having vent means for discharge of fluids therefrom. The relief valve is a conventional relief valve. This valve comprises a housing formed of body 16 and bonnet 18 with a discharge or outlet port 20 and an inlet port or passage 22 which are disposed at right angles to provide an in-line mounting of the valve closure member with the inlet port. The valve closure member is disc 24 which is biased into a closed position by spring 26.

Body 16 has neck 28 which bears a conventional flange for attachment to downstream discharge piping such as flanged conduit 30. The upper surface of body 16 has a flanged face with tapped bores 32 for the attachment of bonnet 18 with studs 34 and nuts 36. The housing is divided into a valve cavity 38 and spring cavity 40 by plate 42 which serves as a guide for the valve closure assembly. Body 16 also has neck 44 which bears flange 46 for removable attachment to flange 14. The inside surface of neck 44 has means such as threads 48 for the removable attachment of nozzle 50. This nozzle has a flange 52 and a gasket (not shown) with a thickness of about 1/16 inch is mounted between the opposed surfaces of flanges 52 and 46.

Nozzle 50 projects into cavity 38 and terminates therein to support valve seat means for the valve closure member. The end of nozzle 50 is threaded and a ring 56 is placed on the nozzle so that rotation of the ring retracts or extends the ring on the nozzle. The housing has a threaded tap 58 and a lock screw 60 is inserted therein and into engagement with ring 56 to lock the ring against rotation.

The valve closure means comprises disc closure member 24 which is mounted within the inverted cup-shaped holder 62 by stud 64 which is turned into a threaded tap in rod 66. The inside wall of holder 62 is bevelled as shown and its bevelled wall can be engaged by ring 56 when the latter is extended over the end of the nozzle, thereby permitting the retention of the valve in a partially open position for blow down service. In normal operation, ring 56 is locked in a retracted position on the nozzle by screw 60.

Rod 66 is reciprocally mounted within sleeve 70 and its upper end is secured to the lower end of valve stem 68. The stem has a bulbous portion 72 for support of lower spring button 74 which provides a biasing surface for compression spring 26. The upper end of stem 68 extends through threaded sleeve 76 which is turned into a tapped bore 80 in bonnet 18. The lower end of sleeve 76 bears against upper spring button 78 so that advance of sleeve 76 in the tapped bore 80 increases the compressive preloading on the spring. A lock nut 82 is placed on sleeve 76 to secure its position in bore 80. The upper end of bonnet 18 has a central boss 84 which is threaded and fitted with a cap 86.

This invention is incorporated in the aforedescribed safety relief system by simple modifications thereto. This comprises the milling of annular groove or counterbore 90 in the lower face of flange 52 of nozzle 50 and the installation in groove 90 of a frangible disc or diaphragm 92. The flange 52 is also bored at 47 and this bore is tapped for attachment of a threaded conduit in the manner shown and described in FIG. 4.

Various relatively thin rupturable or frangible diaphragms or discs can be used. In FIG. 1 a preferred construction is shown. This comprises a reverse acting device comprising a frangible member sub-assembly with diaphragm 92 secured between first and second mounting rings 94 and 96. A co-acting knife blade sub-assembly comprises sleeve 98 having annular flange 100 and at least one knife blade 102 mounted therein. Gaskets 101 and 103 having a thickness of about 0.010 to about 0.025 inch can be used to maintain a fluid tight seal.

The reverse acting relief device is the preferred embodiment of the invention. This device fails when the system pressure is sufficient to cause the diaphragm to reverse its position and snap over center. The value of this snap-over pressure of these diaphragms can be controlled in the manufacture of the device with a precision that will permit normal operation of the system at pressures up to 90–95 percent of the snap-over pressure. This will permit installation of the relief devices in substantially all existing systems which use safety relief valves.

Figure 2:
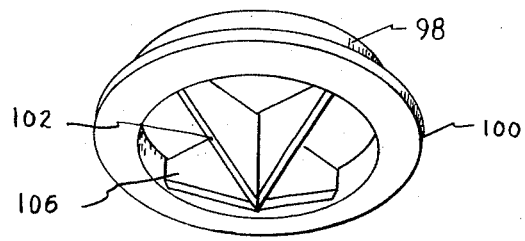
FIGS. 2 and 3 are views of the disc and knife subassemblies of FIG. 1.

FIG. 2 illustrates, in greater detail, the assembly of the knife blade and its holder. This assembly and the companion frangible diaphragm assembly are described in my copending application, Ser. No. 888,394 filed Dec. 29, 1969, and now Pat. No. 3,685,686, which is incorporated herein by reference. Briefly, the knife blade sub-assembly depicted in FIG. 2 comprises an annular support or sleeve body 98 which bears, on its upstream end, annular flange 100. At least one and, preferably, two knife blades 102 and 106 are secured to the inside wall of sleeve body 98 with the apex of the blades directed towards the dome of diaphragm 92. While not shown in FIG. 2, an annular ledge can be provided on the inside upper edge of the sleeve body 98 to support the blades. The blades can be removably locked in body 98 or can be welded to the body.

Figure 3:
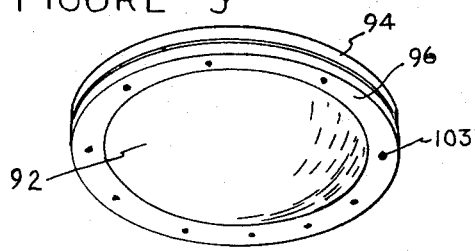

The frangible member assembly shown in FIG. 3 comprises diaphragm 92 having a central dome 93 of smaller diameter than passage 10a and an annular flange that is secured between mounting rings 94 and 96 with spot welds 103, or other suitable fastening means which will secure the assembly. The frangible diaphragm is formed from thin metallic stock having a thickness from about 0.5 to about 50 mils, as required for the relief pressure and diameter of the diaphragm, and can be of any suitable corrosion resistant material, e.g., stainless steel, titanium, aluminum, etc. The diaphragm is formed with a central dome portion having an arcuate cross section, preferably a hemispherical shape.

The diaphragm is conveniently formed into the pre-bulged configurature by assembly of a flat metal disc between the mounting rings. The assembly is clamped in a holder and sufficient pressure is applied to bulge the diaphragm into the illustrated shape.

The aforedescribed relief device insures precision of operation and can attain a safe working pressure that is up to ninety percent of the relief pressure since the sub-assemblies are pre-fabricated under precise factory conditions. In preferred embodiments, the radius of curvature of the inner annular shoulder of the mounting ring 94 which is on the concave side of the disc is less than that of the ring 96 on the convex side of the disc to facilitate the precision of operation. The use of a mounting ring on the downstream side of the diaphragm eliminates the need to observe any critical tolerances in the installation of the relief assembly and the need to have a critically machined surface on the flange that supports the downstream side of the assembly. Instead, the relief assembly of the diaphragm and at least the downstream mounting ring is completed in the factory under controlled assembly conditions where precise alignment is possible. The inside diameter of ring 94 is sufficient to insure that the ring projects beneath the transition between the dome and flange portion of the diaphragm, thereby supporting the diaphragm in the transition area to prevent fatigue failure of the diaphragm in this area. Ring 94 can have a slightly lesser inside diameter than ring 96 to insure that ring 94 will project beneath the transition.

Figure 4:
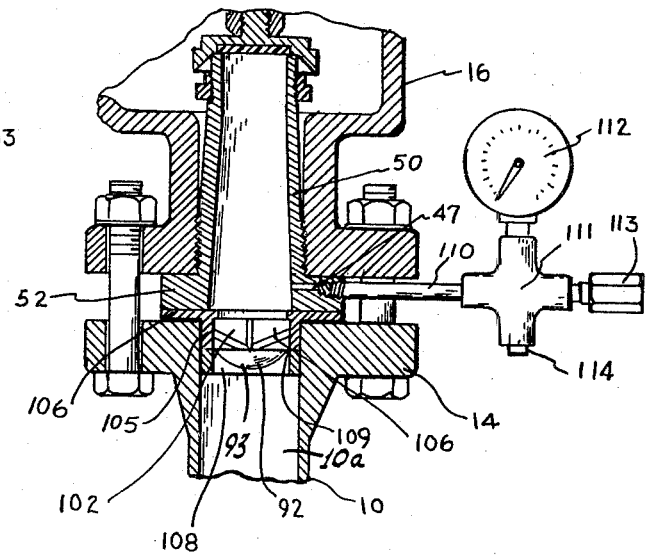
FIG. 4 illustrates an installation that requires minimum of alteration to the relief valve.

FIG. 4 illustrates an alternative embodiment of the invention. The relief valve is supported on flange 14 with a preassembled relief device secured between this flange and flange 52 of nozzle 50. The relief device comprises the knife blade holder which is formed by sleeve 105 that has an annular flange 106. The sleeve is of lesser diameter than the bore in flange 14 to permit its insertion into the flange opening. Flange 106 projects outwardly to permit its retention between flanges 52 and 14.

Gaskets having a thickness of about 0.015 inch can be inserted on each face of flange 106 for a fluid tight seal. The knife blades 102 and 106 are mounted in sleeve 105 in the manner previously described.

The annular flange of diaphragm 92 is supported by the lower edge of sleeve 105 and ring 108 is secured to the downstream face of the annular flange of the diaphragm. The assembly can be secured by a fusion weld around the periphery of these joined surfaces so that the entire relief device can be inserted as a single unit. The ring 108 is not essential to operation of the device, however, it is preferred since it protects diaphragm 92 during installation and also supports the transition 109 of the diaphragm during pressure reversals of the system.

A radial bore or port 47 is also provided in flange 52 of nozzle 50 of the relief value and conduit 110 is fitted into this bore. This conduit supports cross 111 with pressure gauge 112, bleed valve 113 and plug 114. The plug can be removed and a source of compressed gas can be attached to permit testing of the set relief pressure of the relief valve without interrupting the process since diaphragm 92 isolates the valve from the system pressure.

The device shown in FIG. 4 can be installed without disturbing downstream piping such as conduit 30 shown in FIG. 1. In this installation, flange 106 has a thickness of about 0.125 to 0.201 inch, typically about 0.135 inch. The gasket commonly used with relief valves has a thickness of about 0.067 inch. This gasket is removed and the device is inserted with two gaskets which have a thickness of about 0.015 inch. The complete installation thus raises the relief valve 0.098 inch, a distance which is within the tolerances for bolted flanges, and, accordingly, the outlet flange of the relief valve can still be fitted to the flange of the discharge piping.

Sleeve 105 has a lesser diameter than conduit 10 and some reduction in flow area occurs with this device. This reduction, however, will not be significant for most installations provided that the rupture relief area will still equal the valve port area. This requirement can be met with most systems. The preassembled device can also be installed between the flanges of any of the upstream piping 10 and need not be installed at the inlet flange of the relief valve.

Figure 5:
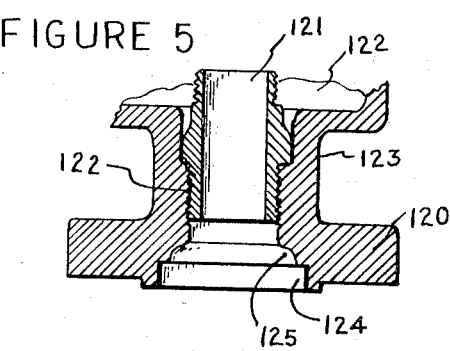
FIG. 5 illustrates modification of the inlet flange of a typical relief valve.

FIG. 5 illustrates modification of the flange 120 of a relief valve body 122 to accommodate the assembly shown in FIGS. 1 - 3. The valve shown has a nozzle 121 that is threaded into a tapped bore 122 in neck 123 of the valve. The face of flange 120 of the valve is counterbored at 124 to provide a recessed seat that will accommodate a sufficient amount of the thickness of the flange 100 and rings 94 and 96 to permit insertion of the relief assemblies of FIGS. 2 and 3 without disturbing the piping downstream of the valve. In this installation, sleeve 98 should fit within counterbore 125, and, in some instances, it may be necessary to enlarge this counterbore to accommodate sleeve 98.

The devices shown in FIGS. 1 - 4 are preferred since they can be installed with a minimum of changes to existing relief systems. The only change necessary to an existing system is replacement of the inlet nozzle with a nozzle such as 50 having groove 90 milled in its lower face and/or bore 47 tapped through from its outer edge. The relief systems of all the process equipment of a unit or a plant can be changed in a single turn around by replacement of the nozzles as described herein. Use of the preassembled units of the knife and diaphragm shown in FIGS. 2 and 3 or the single unit of FIG. 4 frees the installation of the need to observe any critical tolerances in the mounting of the diaphragm and permits the mass installation of the devices without the custom machining heretofore required in the installation of frangible diaphragms.

In operation, the devices of FIGS. 1 - 4 fail when the upstream pressure exceeds the design relief pressure and exerts an axial force on the diaphragm which is sufficient to cause elastic instability in the transition between the flat annular portion and the central dome portion of the diaphragm. The diaphragm responds by snapping over center, i.e., by reversing its upstream face from a convex to a concave configuration and the knife blade impales the diaphragm as it snaps over center.

Other relief means can also be used in combination with the relief valve shown in FIG. 1. Typical of these are the pre-bulged frangible diaphragms which are mounted with their concave sides oriented towards the system pressure. These devices can be used together with support members on either or both sides of the diaphragm to achieve improvements in the operation of the diaphragm.

Figure 6:
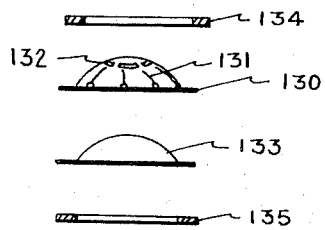
FIG. 6 illustrates an alternative relief device.

FIG. 6 illustrates the use of the pre-bulged diaphragm relief device. Although the diaphragm could be used without any support on its downstream side, improvement in the precision of operation of the device is achieved by the use of a pre-weakened support member such as shown at 130. The preferred construction of this support member is that which is described in copending application, Ser. No. 881,234 filed Dec. 1, 1969, and now abandoned which is hereby incorporated by reference. This member has a plurality of radial rupture lines 131 which are scored, slitted or slotted in its dome portion. The lines extend from a central apex which has a plurality of arcuate slots 132 which are close to the ends of lines 131 so that, upon failure of the member, lines 131 will tear into the slots. The slots then will tear into each other in a head to tail fashion to form a small apex center and a plurality of sectored leaves which open and release the support of diaphragm 133. The unsupported diaphragm readily ruptures under the system pressure. To insure precision in the installation of the relief device of FIG. 6, mounting ring 134 is used and the device is preassembled to this ring so that the installation only requires insertion of the relief assembly between mating flanges of piping upstream of the relief valve. A second ring 135 can be included on the upstream side of the flange of diaphragm 133 and the entire assembly can be secured together by welding.

The invention has been described and illustrated with regard to presently preferred or best modes of practice. It is not intended that the invention be unduly limited by this illustration. Instead, it is intended that the invention be defined by the elements and their obvious equivalents set forth in the following claims.

What is claimed is:

1. In a fluid pressure system having a relief valve for protecting it from over-pressure, said fluid pressure system having an exit passage for communication with the valve with a flange at the end thereof, said valve having an inlet end and an inlet passage for communication with said exit passage and a discharge outlet for connection thereto of discharge piping, an isolation system for the relief valve comprising rupture disc means isolating the relief valve from said fluid pressure system, said rupture disc means comprising a relatively thin rupturable disc having a central dome and a generally flat annular flange surrounding said dome and integral therewith at a circular transition between the outer periphery of the dome and the inner periphery of said annular flange of the disc, said dome being of smaller diameter than one of the said passages, and said rupture disc being secured in position via securement of the inlet end of the relief valve to said flange at the end of said exit passage with its dome accommodated in said one passage, and its said annular flange sealed with respect to both said passages and with said inlet end of the relief valve and said flange at the end of said exit passage closely adjacent one another without any substantial change in the position of the outlet of the relief valve from what its position would be with the relief valve installed on said flange at the end of said exit passage without the said rupture disc means, whereby said rupture disc means may be installed without substantial alteration of said discharge piping, said dome being adapted to rupture at a predetermined over-pressure in said fluid pressure system to communicate said over-pressure to said relief valve, and said relief valve having a port therein for communication between the outside of the relief valve and the inside of the relief valve downstream from the disc, said rupture disc being a reverse acting disc with its dome of smaller diameter than the said exit passage of said fluid pressure system, said disc being secured in position with the dome accommodated in said exit passage with its convex side directed upstream in said exit passage, said dome being adapted to snap over in downstream direction at said predetermined over-pressure, said rupture disc means further comprising knife means for cutting the dome when it snaps over, said knife means comprising at least one knife blade and an annular support for the blade, said annular support overlying the downstream face of said annular flange of the disc and being in sealed relation thereto, said annular support having an annular flange overlying the downstream face of the said annular flange of the disc, both these flanges being clamped between the inlet end of the relief valve and the said flange at the end of said exit passage, said relief valve having a counterbore at its inlet end around its inlet passage, and said annular support and knife blade being at least partially accommodated in said counterbore.

2. In a fluid pressure system as set forth in claim 1, the relief valve having a nozzle threaded therein from its inlet end, said nozzle having a flange at its outer end, said inlet passage being in said nozzle, and said counterbore being in said nozzle flange, and said nozzle flange having said port therein for introducing a compressed gas downstream from the disc for testing the relief valve without venting the pressure system.

* * * * *